US010587475B2

(12) United States Patent
Yethadka et al.

(10) Patent No.: US 10,587,475 B2
(45) Date of Patent: Mar. 10, 2020

(54) NETWORK DISCOVERY OPTIMIZATION USING SUPPLEMENTAL INFORMATION PUBLISHED BY DEVICES

(71) Applicant: Extreme Networks, Inc., San Jose, CA (US)

(72) Inventors: Venkateshwara Prasad Yethadka, Mangalore (IN); Krishna Prasad S, Karnataka (IN); Abhin Balur, Belgaum (IN)

(73) Assignee: Extreme Networks, Inc., San Jose, CA (US)

( * ) Notice: Subject to any disclaimer, the term of this patent is extended or adjusted under 35 U.S.C. 154(b) by 815 days.

(21) Appl. No.: 14/534,099

(22) Filed: Nov. 5, 2014

(65) Prior Publication Data
US 2016/0127197 A1    May 5, 2016

(51) Int. Cl.
*H04L 12/24* (2006.01)

(52) U.S. Cl.
CPC ............ *H04L 41/12* (2013.01); *H04L 41/022* (2013.01); *H04L 41/0853* (2013.01)

(58) Field of Classification Search
CPC ... H04L 41/12; H04L 41/022; H04L 41/0853; H04L 67/10; H04L 43/10; H04L 41/08; H04L 45/02; H04L 45/52; H04L 41/0206; H04L 43/0852; H04L 41/046; H04L 7/00; G06F 8/60; G06F 8/71; Y04S 40/168; Y04S 40/164
USPC ........................................................ 709/224
See application file for complete search history.

(56) References Cited

U.S. PATENT DOCUMENTS

| 8,422,400 | B2 | 4/2013 | Claise et al. | |
|---|---|---|---|---|
| 2004/0196865 | A1* | 10/2004 | Natarajan | H04L 41/12 370/465 |
| 2006/0221826 | A1* | 10/2006 | Bedingfield, Sr. | H04L 41/12 370/229 |
| 2009/0316602 | A1* | 12/2009 | Nandy | H04L 45/02 370/254 |
| 2010/0046395 | A1* | 2/2010 | Sivaramakrishna Iyer | H04L 41/12 370/254 |
| 2011/0236022 | A1* | 9/2011 | Garikapati | H04J 14/0227 398/79 |
| 2013/0183966 | A1 | 7/2013 | Chan et al. | |
| 2016/0088578 | A1* | 3/2016 | Das | H04W 56/001 370/350 |

FOREIGN PATENT DOCUMENTS

WO    2014001216 A1    1/2014

* cited by examiner

*Primary Examiner* — Tan Doan
(74) *Attorney, Agent, or Firm* — Sterne, Kessler, Goldstein & Fox P.L.L.C.

(57) ABSTRACT

Methods, systems and computer readable media for optimizing (or improving) network discovery using supplemental information published by devices and available on their neighbor devices are described. In some implementations, the method can include obtaining, at a network management computer system, a list of one or more seed devices. The method can also include retrieving a device identifier of a corresponding seed device from the list of one or more seed devices. The method can further include querying, at the network management computer system, the corresponding seed device to obtain neighboring device connectivity information of the seed device and supplemental information for each neighboring device.

20 Claims, 4 Drawing Sheets

NETWORK DISCOVERY OPTIMIZATION USING SUPPLEMENTAL INFORMATION PUBLISHED BY DEVICES

TECHNICAL FIELD

Embodiments relate generally to computer networks, and more particularly, to methods, systems and computer readable media for using supplemental information in network discovery optimization.

BACKGROUND

In some typical networks, it may be normal to have access devices connected to a variety of end point devices (e.g., wireless access point, IP telephone, or the like) which send discovery packets using a Layer-2 (L2) discovery protocol to the connected access switch. Some end point devices may not have (or have enabled) management protocol support (e.g., Simple Network Management Protocol (SNMP) or other management protocol support). A conventional or typical network discovery process can include a crawling algorithm, which may try to retrieve information about any devices that are neighbors to a device being currently visited in the discovery process (or crawl) by sending management requests (e.g., via SNMP). These requests may timeout when for devices that do not have (or have enabled) management protocol support. When a network contains thousands of such end point devices, the management system may waste considerable time during the network discovery process.

Embodiments were conceived in light of the above mentioned needs, problems and/or limitations, among other things.

SUMMARY

By using the supplemental data collected about neighboring device(s), an implementation can determine whether a given neighbor device should be visited or not visited by the crawling algorithm. With the optimization described herein, the network discovery process carried out by a network management system can stop crawling to end point devices that likely do not support a management protocol (e.g., SNMP).

One or more embodiments can include methods, systems and computer readable media for using supplemental information in network discovery optimization. In some implementations, the method can include obtaining, at a network management computer system, a list of one or more seed devices. The method can also include retrieving a device identifier of a corresponding seed device from the list of one or more seed devices. The method can further include querying, at the network management computer system, the corresponding seed device to obtain neighboring device connectivity information of the seed device and supplemental information for each neighboring device, where the supplemental information is used to determine whether the neighboring device is likely to have support for a communication protocol being used for network discovery.

The method can also include iterating, at the network management computer system, over any neighboring devices of the corresponding seed device and querying each neighboring device having corresponding supplemental information indicating that the neighboring device is compatible with a communication protocol being used for network discovery. The method can further include stopping the iterating when a termination condition is reached.

The method can also include recursively iterating, at the network management computer system, over any neighboring devices of each corresponding neighboring device of a seed device and querying each neighboring device having corresponding supplemental information that is used to determine if the neighboring device should be visited or not. The method can further include when another seed device identifier is available from the list, retrieving a device identifier of a next corresponding seed device from the list of one or more seed devices.

The seed device identifier can include an Internet Protocol address. The supplemental information can include device capability information. The communication protocol being used for network discovery can include SNMP.

Some implementations can include a network management computer system comprising one or more processors configured to perform operations corresponding to the method described above.

Some implementations can include a nontransitory computer readable medium having stored thereon software instructions that, when executed by one or more processors, cause the one or more processors to perform operations corresponding to the method described above.

DETAILED DESCRIPTION

In general, some implementations optimize (or improve the efficiency of) some standard network discovery crawling algorithm approaches by making use of supplemental information (e.g., device capability data) available about neighboring devices provided from a device currently being visited by the crawling process. For example, by making use of the supplemental data (e.g., device capabilities or the like) published in discovery protocol data by neighbor devices, an implementation can make a determination to stop the network discovery algorithm (crawler) from proceeding to a neighbor device and incurring one or more time-outs when the neighboring device does not respond to the network discovery query in a network management protocol.

Some conventional network discovery is done by crawling over the network retrieving the neighbor connectivity information stored in the devices starting with the seed device(s) and then repeating the same with the neighbor devices found in the process. The stored neighbor connectivity information is built using the data published by the neighboring devices using a Layer-2 network/neighbor discovery protocol (e.g., LLDP, CDP or the like). A network management system can use some mechanism/protocol (e.g., SNMP, NetConf or the like) to retrieve this information from devices.

In a typical network, it is normal to have access switches connected to a variety of end point devices which send discovery packets using a layer-2 discovery protocol to the connected access switch. Most of such end point devices likely not have (or enable) a management protocol support such as SNMP. In this scenario, the IP address range or subnets specified in the SNMP (or other management protocol) credentials/profile settings for network discovery in NMS, will generally contain a large number of such devices that are not accessible to the management protocol used by the discovery.

The normal crawling algorithm described above will try to retrieve the neighbor information from these devices by sending management requests (e.g. SNMP) to them. These requests will timeout as the devices as most of the end point devices likely not support (or enable) the management protocol. As an example of a NMS using SNMP for discovery, if it uses a 10 second timeout and retry count of 2 for SNMP access, then for each such device the NMS tool wastes 20 seconds. When a network contains thousands of such devices (which may be normal for a typical service provider), the time wasted during network discovery could be quite large (several hours).

Figure 1:
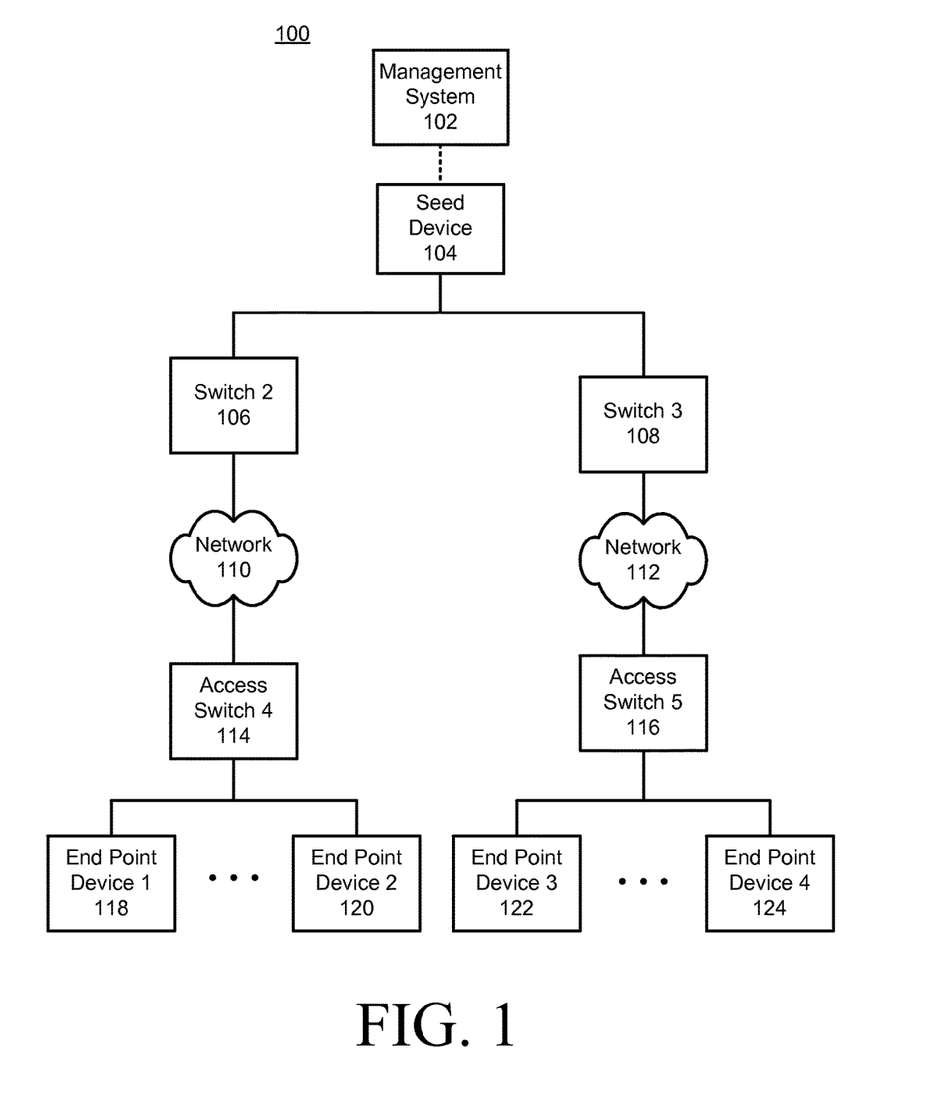
FIG. 1 is a diagram of an example network showing network discovery without using supplemental information.

As shown in FIG. 1, an example conventional network environment 100 (e.g., an enterprise network) includes a network management system 102, one or more L2/L3 switches (106, 108, 114, 116) of which one or more are access switches (114, 116), one or more networks (110 and 112), one or more end point devices (118-124). Network 110 includes a finite number of L2/L3 switches with connections between them such that there is at least one path from L2/L3 switch 106 and access switch 114. Similarly, network 112 includes a finite number of L2/L3 switches with connections between them such that there is at least one path from L2/L3 switch 108 and access switch 116.

In an example typical network discovery operation, seed device address information is provided to the management system 102 (e.g., an IP address of L2/L3 Switch 1 104). A conventional (i.e., one without supplemental information features as described herein) network discovery tool can begin the discovery process by retrieving neighbor connection data from the seed device. The discovery algorithm then begins visiting (or crawling) to the neighbor devices found in the data retrieved from the seed device and repeating retrieving neighbor connection data for each neighbor device visited.

For example, in the network shown in FIG. 1, the management system 102 can retrieve neighbor information from L2/L3 Switch 1 104 (i.e., the seed device). L2/L3 Switch 1 104 can provide connection information indicating that its neighbors are L2/L3 Switch 2 106 and L2/L3 Switch 3 108. However, the management system 102 includes a typical network discovery process that does not make use of supplemental information. Thus, the management system 102 proceeds to visit the neighboring devices (e.g., L2/L3 Switch 2 106 and L2/L3 Switch 3 108) based merely on connection information.

The conventional network discovery process then proceeds to visit L2/L3 Switch 2 106 and L2/L3 Switch 3 108. Each neighboring device provides information about its respective neighboring devices.

The conventional network discovery process then proceeds crawling through the networks 110 and 112 to reach and visit Access Switch 4 114 and Access Switch 5 116. Upon visiting L2/L3 Switch 4 114, the conventional network discovery process can determine its neighboring devices (e.g., End Point Device 1 118 and End Point Device 2 120).

End Point Device 1 118 and End Point Device 2 120 may not support (or have enabled support) a management protocol. The conventional network discovery process will attempt to query the end point devices using a management protocol and will have to wait on one or more timeouts because the end point devices will not respond to the management protocol messages from the management system 102. Thus, the management system 102 may spend considerable time waiting for one or more timeouts attempting to contact a device that does not support the management protocol.

As the crawling algorithm visits each access switch, the neighbor connection data is retrieved and the algorithm further crawls to the newly learned neighbor devices. Some (or even most) of the end point devices may not have (or have enabled) support for a management protocol (e.g., SNMP) used by the network management system (NMS). As a result, request to retrieve neighbor connectivity data from these devices fail after a given time-out period. Network management systems generally retry a device a pre-set number of times and each retry attempt will time-out as well. In a network deployment with thousands of such end point devices, the time consumed in trying to retrieve from end point devices can have a significant impact (e.g., increase) on network discovery time.

Figure 2:
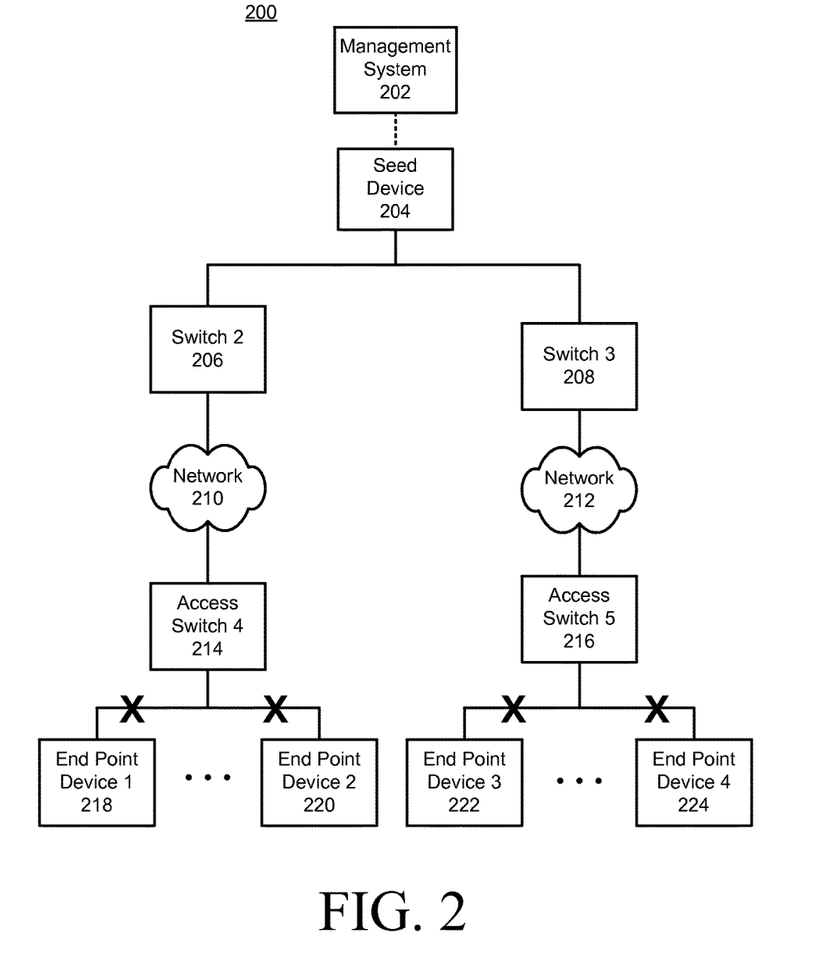
FIG. 2 is a diagram of an example network showing network discovery using supplemental information in accordance with at least one implementation.

FIG. 2 shows a network environment 200 including a management system 202 with an implementation of the network discovery that uses supplemental information in accordance with the present disclosure. As shown in FIG. 2, an example conventional network environment 200 (e.g., an enterprise network) includes a network management system 202, one or more L2/L3 switches (206, 208, 214, 216), one or more networks (210 and 212), one or more end point devices (218-224). Network 210 includes a finite number of L2/L3 switches with connections between them such that there is at least one path from L2/L3 switch 206 and access switch 214. Similarly, network 212 includes a finite number of L2/L3 switches with connections between them such that there is at least one path from L2/L3 switch 208 and access switch 216.

In an example network discovery process using supplemental information, seed device address information is provided to the management system 202 (e.g., an IP address of L2/L3 Switch 1 204). The network discovery tool can begin the discovery process by retrieving neighbor connection data and supplemental information about each neighboring device from the seed device. Next for each of the neighbor device, the discovery algorithm makes an informed decision using the supplemental information, whether to visit (crawl to) that device. Based on such decision, the discovery algorithm then proceeds to visit (or crawl) to a neighbor device or stops crawling to a neighbor device.

For example, in the network shown in FIG. 2, the management system 202 can retrieve neighbor information from L2/L3 Switch 1 204 (i.e., the seed device). L2/L3 Switch 2 204 can provide connection information indicating that its neighbors are Switch 206 and Switch 208. Because the management system 202 includes a network discovery process that includes utilizing supplemental information, the network discovery process can also include querying the current device (e.g., 204) for supplemental information about its neighboring devices. For example, Switch 204 can provide information about each of its neighbor devices which can be used to determine if the neighboring device is an end point device or not. Based on the connection information and the supplemental capability information, the management system can determine to crawl (or visit) the neighboring devices (e.g., L2/L3 Switch 2 206 and L2/L3 Switch 3 208).

Thus, the management system 202 proceeds to visit the neighboring devices (e.g., L2/L3 Switch 2 206 and L2/L3 Switch 3 208) based on both connection information and supplemental information. Each neighboring device provides information about its respective neighboring devices.

The network discovery process proceeds crawling through the networks 210 and 212 to reach and visit Access Switch 4 214 and Access Switch 5 216. Upon visiting L2/L3 Switch 4 214, the network discovery process can determine its neighboring devices (e.g., End Point Device 1 218 and End Point Device 2 220) and determine supplemental information about each neighbor device. Using the supplemental information, the management station can determine that these neighbor devices are end-point devices and decide not to visit them as they are likely not to support or enable the network management protocol. The network discovery process can use the supplemental information to determine not to visit the end point devices (e.g., 218 and 220) as indicated by the "X" mark between 214 and each of 218 and 220, and between 216 and each of 222 and 224. Thus, the management system 202 can avoid wasting time attempting to query these devices (e.g., avoid waiting for one or more timeouts for devices that do not support the management protocol).

For example, some implementations can include methods or system that optimize (or improve the efficiency of) standard network discovery crawling algorithm(s) by making use of supplemental information (e.g., device capability data) of neighboring devices available in the device currently being queried to make an informed decision about whether a neighboring device whether a neighboring device is likely to have the support to respond to the requests from the NMS or not. The optimization, stops crawling without sending any management information retrieval query to end point devices which generally do not have that support. In a network with thousands of such end point devices, this reduces the time for the entire network discovery significantly.

In another example implementation, a network management system (e.g., Configuration and Orchestration Manager made by Avaya, Inc.) can include a network discovery engine that uses LLDP information stored in devices to detect neighbor devices for the crawling algorithm. The NMS can use SNMP as the management protocol for retrieving the LLDP data from devices.

In addition to retrieving the connectivity information to neighbors from a device, the NMS can also retrieve the following example supplemental information that the neighbor devices have published (in their LLDP messages) and are available from the device in the standard LLDP MIB:

a) attribute lldpRemManAddrOID of MIB table lldpRemManAddrTable, where the lldpRemManAddrOID attribute can include a value used to identify the type of hardware component or protocol entity associated with the management address advertised by the remote system agent.

b) attribute lldpRemSysCapSupported of MIB table lldpRemTable, where the lldpRemSysCapSupported attribute can include a bitmap value used to identify which system capabilities are supported on the remote system.

If for a remote device (neighbor) the lldpRemManAddrOID is available (non-empty), then the NMS can determine if its value corresponds to sysObjectID of any type of device the Network Management tool can use to determine that the end point device is likely to not support a management protocol (e.g., SNMP). If so, the network discovery process can stop crawling this branch by skipping sending any SNMP request to such a neighbor device.

If the NMS cannot determine from the lldpRemManAddrOID, if the neighbor device can be skipped, the NMS can retrieve the MIB attribute lldpRemSysCapSupported and make use of its value to determine the capabilities of the neighbor. The possible values for this attribute can include one or more other values (e.g., other, bridge, wlanAccessPoint, router, telephone, docsisCableDevice, stationOnly or the like).

If the lldpRemSysCapSupported value contains one of the values (e.g., other, repeater, wlanAccessPoint, telephone, docsisCableDevice, stationOnly or the like) and does not contain value "router", the NMS will determine that the corresponding neighbor device is an end point device and stop crawling to that device and skip sending any SNMP request to it. Thus an implementation can stop the crawl to a device as soon as it finds that the device is not likely to have SNMP capability, making this determination from the data available on the already discovered neighbor, thus saving the time spent in making a SNMP request to the device which eventually times out.

For example, an example implementation was used to discover a network that has 173 L2/L3 switches and 1300 end point devices for evaluation purposes against a conventional (e.g., non-supplemental information) network discovery process. The time for network discovery with the conventional implementation without using supplemental information was about 530 minutes on average. The time for network discovery using supplemental information as described herein was about 78 minutes on average.

Figure 3:
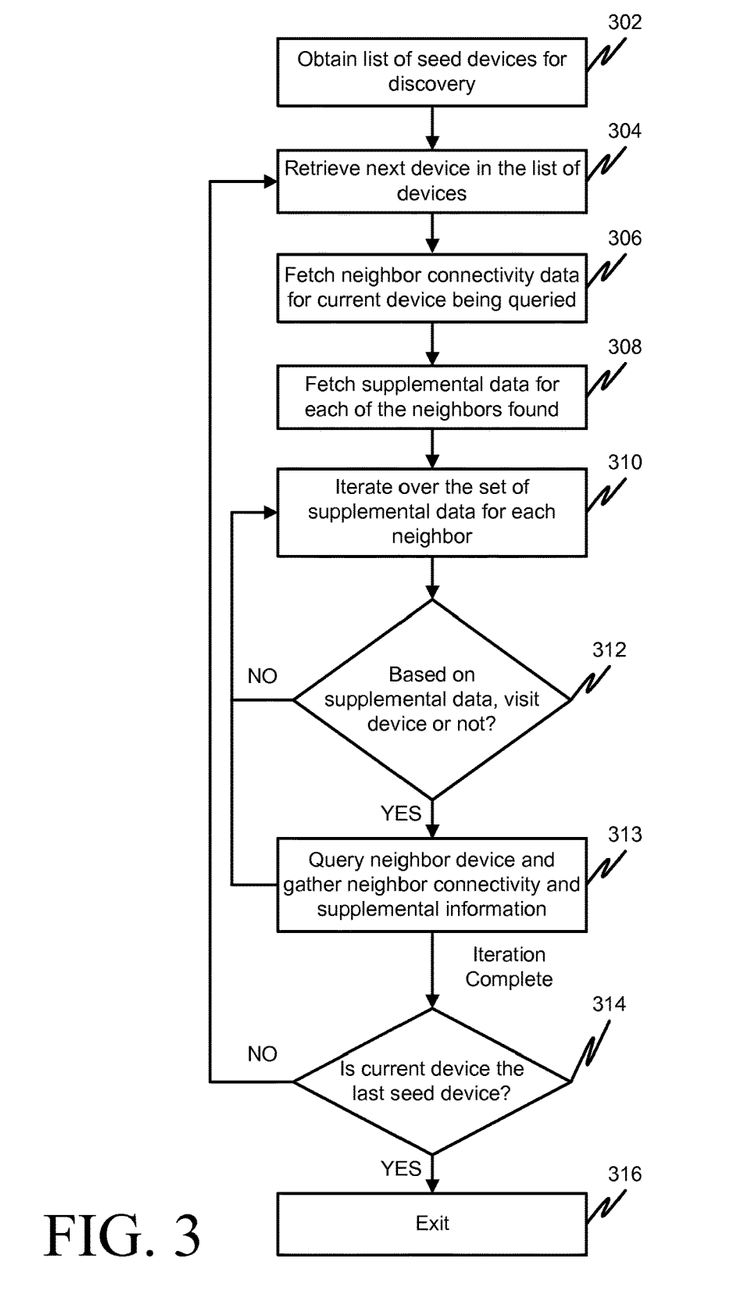
FIG. 3 is a flow chart of an example method for network discovery using supplemental information in accordance with at least one implementation.

FIG. 3 is a flow chart of an example method for network discovery using supplemental information in accordance with at least one implementation. Processing begins at 302, where a list of seed devices for network discovery is obtained. For example, a management system 202 can obtain a list of one or more seed devices. The list can include a device identifier (e.g., an IP address or other address for L2/L3 Switch 1 204). Processing continues to 304.

At 304, next (or first) device information is retrieved from the list (e.g., the list of one or more seed devices). For example, an identifier (an IP address or other address) for L2/L3 Switch 1 204 can be retrieved from the list. Processing continues to 306.

At 306, neighboring device connectivity data is obtained from the current device being queried. For example, the network management system 202 can obtain the neighboring device information from L2/L3 Switch 1 204. Processing continues to 308.

At 308, at 308 supplemental data for each of the neighbors is obtained. For example, the network management system 202 could obtain supplemental data about Access Devices 2 and 3 from L2/L3 Switch 1. Processing continues to 310.

At 310, the supplemental data for each neighbor is iterated over. For example, the supplemental data (e.g., capability data) for Access Devices 2 and 3 could indicate that each of the devices supports the network management protocol being used. Once the iteration is complete, processing continues to 314, otherwise processing continues to 312.

At 312, it is determined, based on supplemental data, whether to visit a neighboring node or not. For example, as described above, if supplemental data about the capabilities of a device indicate that the device can support a network management protocol being used, then the system can determine to visit the device. For example, the network management system 202 can learn that L2/L3 Switch 4 is a neighbor device of L2/L3 Switch 2 and that the supplemental data about L2/L3 Switch 4 obtained from L2/L3 Switch 2 indicate that L2/L3 Switch 4 is likely to support (or not support) the network management protocol (e.g., SNMP) being used. For example, based on device capabilities supplemental information a system can determine that the neighboring device is likely not to have SNMP support capability or enabled. In another example, the management system 202 can determine the neighbors of L2/L3 Switch 4 214 (e.g., End Point Device 1 218 and End Point Device 2 220). If the device is to be visited (or queried) then processing continues to 313, otherwise processing continues back to 310.

At 313, the neighbor device is queried and neighbor connectivity and supplemental data are gathered for the neighbor device. If the iteration is complete, processing continues to 314, otherwise processing continues back to 310.

At 314, it is determined whether the current device is the last seed device. For example, once all the neighbors of L2/L3 Switch 1 with appropriate supplemental data have been visited, the process will end as the seed device list in this example only contains L2/L3 Switch 1 204. If so, processing continues to 316, where processing ends. Otherwise, processing continues to 304.

Figure 4:
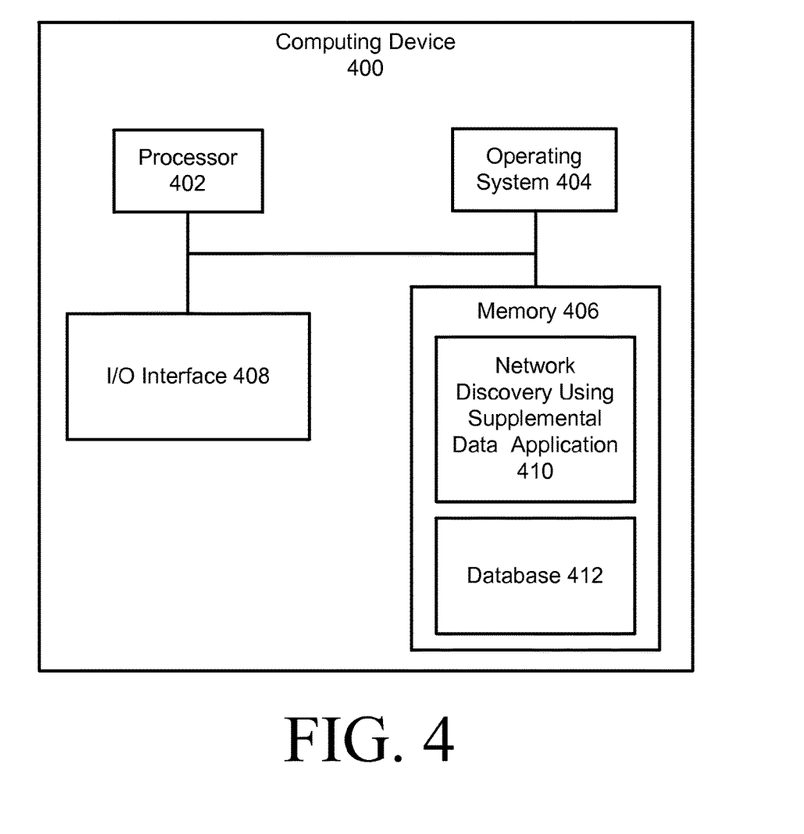
FIG. 4 is a diagram of an example computer system for network discovery using supplemental information in accordance with at least one implementation.

FIG. 4 is a diagram of an example computer system 400 in accordance with at least one implementation. The computer 400 includes a processor 402, operating system 404, memory 406 and I/O interface 408. The memory 406 can include an application for network discovery using supplemental information 410 and a database 412 (e.g., for storing network information, device lists, neighboring device lists, supplemental device information or the like).

In operation, the processor 402 may execute the application 410 stored in the memory 406. The application 410 can include software instructions that, when executed by the processor, cause the processor to perform operations for network discovery using supplemental information in accordance with the present disclosure (e.g., performing one or more of steps 302-316 described below). The application 410 can operate in conjunction with the database 412 and the operating system 404.

Some implementations can provide a significant saving in time required for overall network discovery as compare to some conventional network discovery solutions. The saving in time can increase as the number of end point devices increases in the network. Some conventional network discovery solutions may not use supplemental information published in a discovery protocol messages to optimize the crawling algorithm for network discovery as described herein.

It will be appreciated that the modules, processes, systems, and sections described above can be implemented in hardware, hardware programmed by software, software instructions stored on a nontransitory computer readable medium or a combination of the above. A system as described above, for example, can include a processor configured to execute a sequence of programmed instructions stored on a nontransitory computer readable medium. For example, the processor can include, but not be limited to, a personal computer or workstation or other such computing system that includes a processor, microprocessor, microcontroller device, or is comprised of control logic including integrated circuits such as, for example, an Application Specific Integrated Circuit (ASIC). The instructions can be compiled from source code instructions provided in accordance with a programming language such as Java, C, C++, C#.net, assembly or the like. The instructions can also comprise code and data objects provided in accordance with, for example, the Visual Basic™ language, or another structured or object-oriented programming language. The sequence of programmed instructions, or programmable logic device configuration software, and data associated therewith can be stored in a nontransitory computer-readable medium such as a computer memory or storage device which may be any suitable memory apparatus, such as, but not limited to ROM, PROM, EEPROM, RAM, flash memory, disk drive and the like.

Furthermore, the modules, processes systems, and sections can be implemented as a single processor or as a distributed processor. Further, it should be appreciated that the steps mentioned above may be performed on a single or distributed processor (single and/or multi-core, or cloud computing system). Also, the processes, system components, modules, and sub-modules described in the various figures of and for embodiments above may be distributed across multiple computers or systems or may be co-located in a single processor or system. Example structural embodiment alternatives suitable for implementing the modules, sections, systems, means, or processes described herein are provided below.

The modules, processors or systems described above can be implemented as a programmed general purpose computer, an electronic device programmed with microcode, a hard-wired analog logic circuit, software stored on a computer-readable medium or signal, an optical computing device, a networked system of electronic and/or optical devices, a special purpose computing device, an integrated circuit device, a semiconductor chip, and/or a software module or object stored on a computer-readable medium or signal, for example.

Embodiments of the method and system (or their subcomponents or modules), may be implemented on a general-purpose computer, a special-purpose computer, a programmed microprocessor or microcontroller and peripheral integrated circuit element, an ASIC or other integrated circuit, a digital signal processor, a hardwired electronic or logic circuit such as a discrete element circuit, a programmed logic circuit such as a PLD, PLA, FPGA, PAL, or the like. In general, any processor capable of implementing the functions or steps described herein can be used to implement embodiments of the method, system, or a computer program product (software program stored on a nontransitory computer readable medium).

Furthermore, embodiments of the disclosed method, system, and computer program product (or software instructions stored on a nontransitory computer readable medium) may be readily implemented, fully or partially, in software using, for example, object or object-oriented software development environments that provide portable source code that can be used on a variety of computer platforms. Alternatively, embodiments of the disclosed method, system, and computer program product can be implemented partially or fully in hardware using, for example, standard logic circuits or a VLSI design. Other hardware or software can be used to implement embodiments depending on the speed and/or efficiency requirements of the systems, the particular function, and/or particular software or hardware system, microprocessor, or microcomputer being utilized. Embodiments of the method, system, and computer program product can be implemented in hardware and/or software using any known or later developed systems or structures, devices and/or software by those of ordinary skill in the applicable art from the function description provided herein and with a general basic knowledge of the software engineering and computer networking arts.

Moreover, embodiments of the disclosed method, system, and computer readable media (or computer program product) can be implemented in software executed on a programmed general purpose computer, a special purpose computer, a microprocessor, a network server or switch, or the like.

It is, therefore, apparent that there is provided, in accordance with the various embodiments disclosed herein, methods, systems and computer readable media for network discovery using supplemental information.

While the disclosed subject matter has been described in conjunction with a number of embodiments, it is evident that many alternatives, modifications and variations would be, or are, apparent to those of ordinary skill in the applicable arts. Accordingly, Applicants intend to embrace all such alternatives, modifications, equivalents and variations that are within the spirit and scope of the disclosed subject matter.

What is claimed is:

1. A method comprising:
obtaining, at a network management computer system and using a network management protocol, a list of one or more seed devices;
retrieving, using the network management protocol, a device identifier of a corresponding seed device from the list of one or more seed devices;
querying, at the network management computer system and using the network management protocol, the corresponding seed device to obtain neighboring device connectivity information of the corresponding seed device and supplemental information for at least one neighboring device;
iterating, at the network management computer system and using the network management protocol, over the supplemental information of the at least one neighboring device of the corresponding seed device;
determining, based on the corresponding supplemental information, whether the at least one neighboring device supports the network management protocol being used by the network management computer system;
stopping the iterating when a termination condition is reached; and
refraining from visiting, during a discovery operation, the at least one neighboring device in response to determining that the at least one neighboring device does not support the network management protocol.

2. The method of claim 1, further comprising:
in response to determining that the at least one neighboring device supports the network management protocol, querying, at the network management computer system, the at least one neighboring device to obtain neighboring device connectivity information of the at least one neighboring device and corresponding supplemental information for neighboring devices of the at least one neighboring device.

3. The method of claim 1, further comprising:
in response to a second device identifier being available from the list of one or more seed devices, retrieving the second device identifier of a next corresponding seed device from the list of one or more seed devices.

4. The method of claim 1, wherein the device identifier comprises an Internet Protocol address.

5. The method of claim 1, wherein the supplemental information comprises device capability information.

6. The method of claim 1, wherein a communication protocol being used for the discovery operation and the network management protocol comprises Simple Network Management Protocol (SNMP).

7. The method of claim 1, further comprising:
determining, based on the corresponding supplemental information, that the at least one neighboring device is an end point device.

8. A network management computer system comprising one or more processors configured to perform operations including:
obtaining, at the network management computer system and using a network management protocol, a list of one or more seed devices;
retrieving, using the network management protocol, a device identifier of a corresponding seed device from the list of one or more seed devices;
querying, at the network management computer system and using the network management protocol, the corresponding seed device to obtain neighboring device connectivity information of the corresponding seed device and supplemental information for at least one neighboring device;
iterating, at the network management computer system and using the network management protocol, over the supplemental information of the at least one neighboring device of the corresponding seed device, wherein the supplemental information indicates whether the at least one neighboring device is an end point device or supports the network management protocol being used by the network management computer system;
determining, based on the corresponding supplemental information, whether the at least one neighboring device supports the network management protocol;
stopping the iterating when a termination condition is reached; and
refraining from visiting; during a discovery operation, the at least one neighboring device in response to determining that the at least one neighboring device does not support the network management protocol.

9. The network management computer system of claim 8, wherein the operations further comprise:
in response to determining that the at least one neighboring device supports the network management protocol, querying, at the network management computer system, the at least one neighboring device to obtain neighboring device connectivity information of the at least one neighboring device and corresponding supplemental information for neighboring devices of the at least one neighboring device.

10. The network management computer system of claim 8, wherein the operations further comprise:
in response to a second device identifier being available from the list of one or more seed devices, retrieving the second device identifier of a next corresponding seed device from the list of one or more seed devices.

11. The network management computer system of claim 8, wherein the device identifier comprises an Internet Protocol address.

12. The network management computer system of claim 8, rein the supplemental information comprises device capability information.

13. The network management computer system of claim 12, wherein the device capability information comprises at least one of information associated with hardware component or protocol entity associated with the at least one neighboring device or a bitmap value configured to identify system capabilities of the at least one neighboring device.

14. The network management computer system of claim 8, wherein a communication protocol being used for the discovery operation comprises Simple Network Management Protocol (SNMP).

15. A nontransitory computer readable medium having stored thereon instructions that, when executed by one or more processors, cause the one or more processors to perform operations including:

obtaining, at a network management computer system and using a network management protocol, a list of one or more seed devices;

retrieving, using the network management protocol, a device identifier of a corresponding seed device from the list of one or more seed devices;

querying, at the network management computer system and using the network management protocol, the corresponding seed device to obtain neighboring device connectivity information of the corresponding seed device and supplemental information for at least one neighboring device;

iterating, at the network management computer system and using the network management protocol, over the supplemental information of the at least one neighboring device of the corresponding seed device, wherein the supplemental information indicates whether the at least one neighboring device supports the network management protocol being used by the network management computer system;

determining, based on the corresponding supplemental information, whether the at least one neighboring device supports the network management protocol;

stopping the iterating when a termination condition is reached; and refraining from visiting, during a discovery operation, the at least one neighboring device in response to determining that the at least one neighboring device does not support the network management protocol.

16. The nontransitory computer readable medium of claim 15, wherein the operations further comprise:

in response to determining that the at least one neighboring device supports the network management protocol, querying, at the network management computer system, the at least one neighboring device to obtain neighboring device connectivity information of the at least one neighboring device and corresponding supplemental information for neighboring devices of the at least one neighboring device.

17. The nontransitory computer readable medium of claim 15, wherein the operations further comprise:

in response to a second device identifier being available from the list of one or more seed devices, retrieving the second device identifier of a next corresponding seed device from the list of one or more seed devices.

18. The nontransitory computer readable medium of claim 15, wherein the device identifier comprises an Internet Protocol address.

19. The nontransitory computer readable medium of claim 15, wherein the supplemental information comprises device capability information.

20. The nontransitory computer readable medium of claim 15, wherein operation the network management protocol comprises Simple Network Management Protocol (SNMP).

* * * * *

UNITED STATES PATENT AND TRADEMARK OFFICE
CERTIFICATE OF CORRECTION

PATENT NO. : 10,587,475 B2
APPLICATION NO. : 14/534099
DATED : March 10, 2020
INVENTOR(S) : Yethadka et al.

Page 1 of 1

It is certified that error appears in the above-identified patent and that said Letters Patent is hereby corrected as shown below:

In the Claims

Claim 12, Column 10, Line 61, "rein the supplemental" should read --wherein the supplemental--.

Signed and Sealed this
Twenty-fifth Day of August, 2020

Andrei Iancu
*Director of the United States Patent and Trademark Office*